United States Patent [19]

Powers

[11] 4,165,223
[45] Aug. 21, 1979

[54] METHOD OF MAKING DRY OPTICAL WAVEGUIDES

[75] Inventor: Dale R. Powers, Painted Post, N.Y.

[73] Assignee: Corning Glass Works, Corning, N.Y.

[21] Appl. No.: 883,927

[22] Filed: Mar. 6, 1978

[51] Int. Cl.² .......................................... C03C 25/00
[52] U.S. Cl. .......................................... 65/2; 65/18;
65/30 R; 65/32
[58] Field of Search ............... 65/2, 18, 32, 30 R,
65/34, DIG. 7; 34/21, 104

[56] References Cited

U.S. PATENT DOCUMENTS

| | | | |
|---|---|---|---|
| 2,316,900 | 4/1943 | Taylor | 34/104 |
| 3,993,454 | 1/1976 | DeLuca | 65/18 X |

FOREIGN PATENT DOCUMENTS 121767  6/1944  Australia .................. 34/21

OTHER PUBLICATIONS

Presby et al., "Material Structure of Germanium Doped Optical Fibers and Preforms," Bell System Tech. Journ., vol. 54, #10, 12–1975, pp. 1681–1692.

*Primary Examiner*—Robert L. Lindsay, Jr.
*Attorney, Agent, or Firm*—William J. Simmons, Jr.; Walter S. Zebrowski

[57] ABSTRACT

A method of making low loss glass optical waveguides, wherein at least one coating of glass soot is deposited by the flame hydrolysis process on a starting member. The starting member is removed from the soot preform leaving an aperture therein. While the preform is heated to its consolidation temperature, an atmosphere including a drying agent is caused to flow into the aperture and through the porous preform, thereby removing water from the preform while the soot is consolidated to form a dense glass article. The atmosphere contains optimal amounts of oxygen and drying agent to minimize leaching of dopant oxide from the preform. Since some of the dopant oxide is leached from the preform near the aperture, the central portion of the preform is initially provided with an excess amount of dopant oxide. The resultant draw blank is drawn into an optical waveguide filament.

15 Claims, 8 Drawing Figures

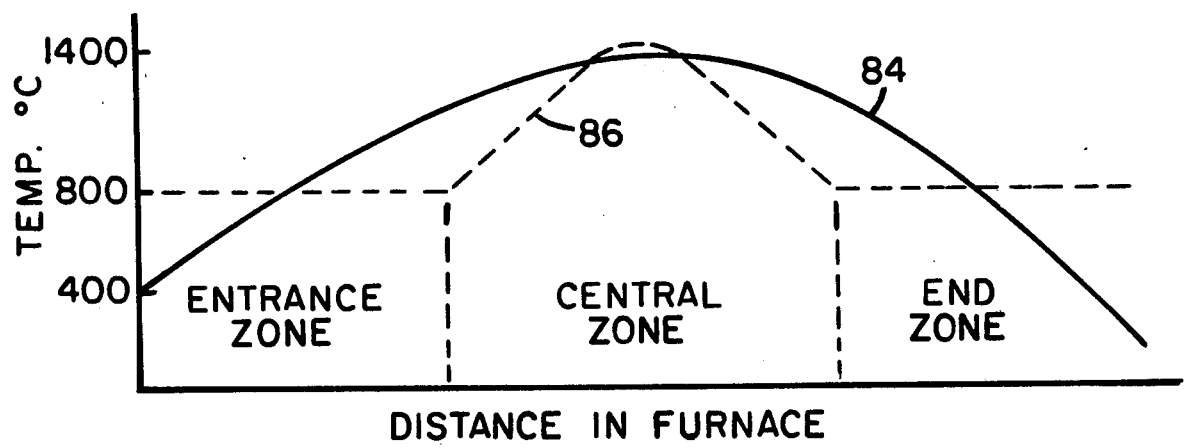
Fig. 6
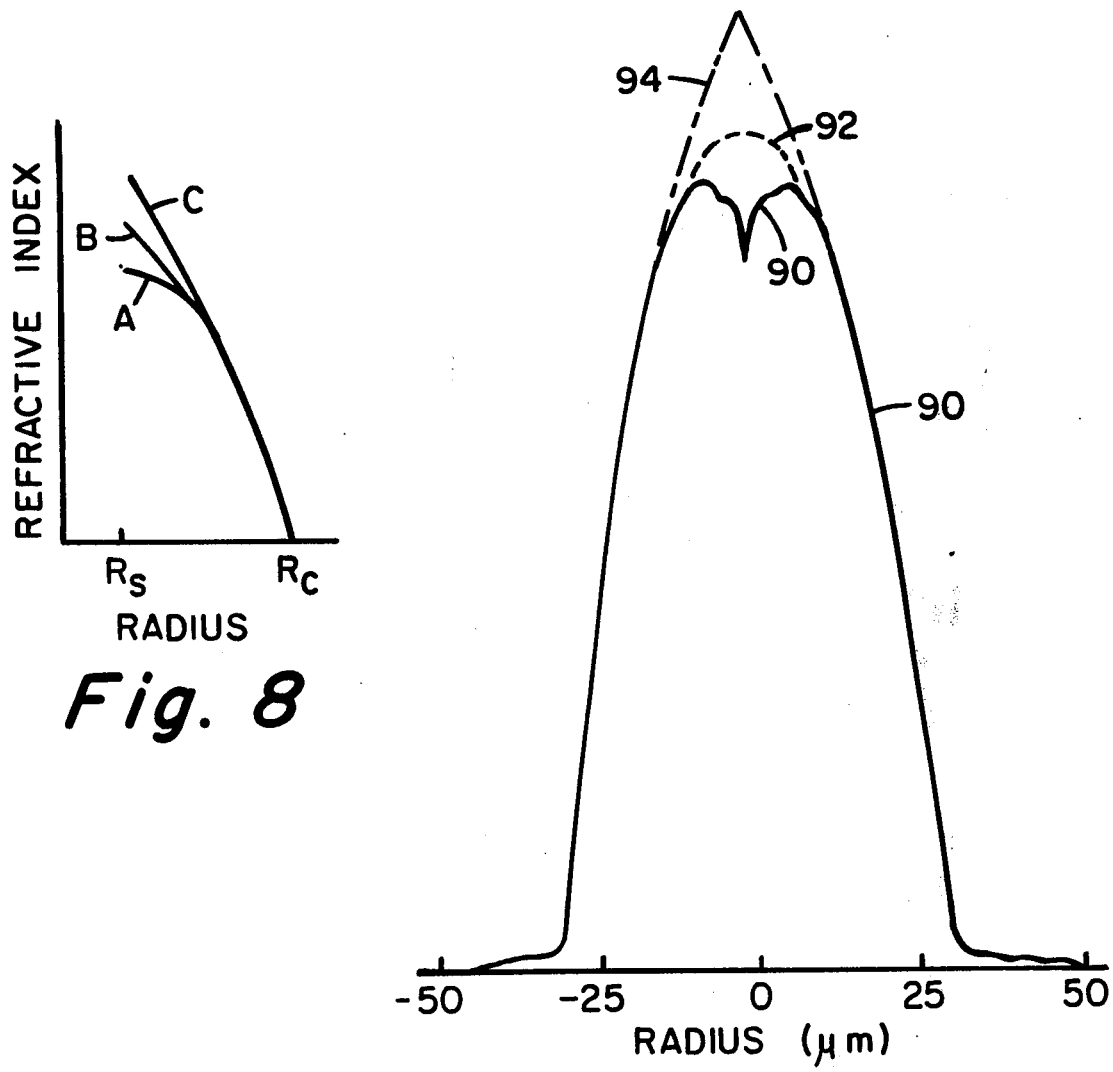
Fig. 8
Fig. 7

METHOD OF MAKING DRY OPTICAL WAVEGUIDES

CROSS-REFERENCE TO RELATED APPLICATION

This application is related to U.S. patent application Ser. No. 752,464 entitled "Method of Making Optical Waveguides" filed by D. R. Powers on Dec. 20, 1976 now abandoned.

BACKGROUND OF THE INVENTION

1. Field of the Invention

This invention relates to a method of forming, by the flame hydrolysis technique, high optical purity blanks from which high quality, substantially water-free optical waveguides can be made.

Optical waveguides, which are the most promising medium for transmission of signals around $10^{15}$ Hz, normally consist of an optical filament having a transparent core surrounded by transparent cladding material having a refractive index lower than that of the core.

The stringent optical requirements placed on the transmission medium to be employed in optical communication systems has negated the use of conventional glass fiber optics, since attenuation therein due to both scattering and impurity absorption is much too high. Thus, unique methods had to be developed for preparing very high purity glasses in filamentary form. Glass preparation techniques which have shown much promise are based on the so-called flame hydrolysis process which employs vapor phase oxidation of high purity vapors to form glass soot. This approach to the formation of low loss optical waveguides is based on methods described in U.S. Pat. Nos. 2,272,342 and 2,326,059 issued to J. F. Hyde and M. E. Nordberg, respectively. The flame hydrolysis technique has been employed to prepare single mode waveguides and multimode waveguides of both the step-index and graded-index type. Various methods employing the flame hydrolysis technique for forming glass optical waveguide filaments are taught in U.S. Pat. Nos. 3,737,292; 3,823,995 and 3,884,550.

The usefulness of glass optical waveguides in optical transmission systems depends upon the attainment of very low loss transmission over the entire wavelength range of about 700–1100 nm. This can be achieved by reducing attenuation due to optical scattering and absorption to a level which approaches the minimum theoretically attainable level. Waveguides in which at least 80% of the scattering loss can be accounted for by intrinsic glass scattering have been made by the aforementioned flame hydrolysis technique. However, due to the presence of residual water produced by this technique, bands of absorption losses between 700 nm and 1100 nm have been excessively large. By residual water in glass is meant that the glass contains a high level of OH, $H_2$ and $H_2O$. One explanation of residual water may be found in U.S. Pat. No. 3,531,271 to W. H. Dumbaugh, Jr. The maximum attenuation in the aforementioned wavelength range that is attributable to residual water occurs at about 950 nm. The remaining portion of the attenuation at 950 nm, which is due to factors such as intrinsic material scattering, amounts to less than 3 dB/km. For example, a glass optical waveguide having an attenuation less than 6 dB/km at 800 nm may have an attenuation greater than 100 dB/km at 950 nm due to the presence of water therein. To be useful in optical communication systems, optical waveguide attenuation is preferably less than 10 dB/km at the wavelength of light being propagated therein. In order to achieve such low attenuation over the entire range between 700 nm and 1100 nm, a glass waveguide filament must be rendered substantially water-free, i.e., the amount of residual water within the filament should be reduced to a level of less than about 10 ppm.

DESCRIPTION OF THE PRIOR ART

Since it is impossible to reduce the water content to acceptable levels after flame hydrolysis-produced soot has been consolidated to form a solid glass coating, the water must be removed before or during the consolidation process. Heretofore, various methods were employed to reduce the water content in optical waveguides produced by flame hydrolysis. Such disadvantages as long processing times, equipment problems and incomplete water removal were encountered.

One prior art method that has been very effective in reducing the water content in fused silica produced by the flame hydrolysis process is disclosed in U.S. Pat. No. 3,933,454. In accordance with that patent a soot preform produced by the flame hydrolysis process is consolidated by inserting it into a consolidation furnace wherein the soot preform is heated to a temperature within the consolidation temperature range for a time sufficient to cause the soot particles to fuse and form a dense glass layer. The soot preform is simultaneously subjected to a stream of a substantially dry chlorine containing gas which flows through the furnace. The chlorine permeates the interstices of the soot preform during the consolidation thereof and replaces hydroxyl ions by chlorine ions, thereby resulting in a glass article that is substantially water-free. However, prior to making contact with the soot preform, the chlorine containing gas can react with the walls of the consolidation furnace to produce volatile compounds such as iron chlorides which can then contaminate the preform. Thus, while the resultant glass article exhibits very little excess attenuation at 950 nm due to water absorption, the overall attenuation thereof across the entire near infrared spectrum is increased due to impurities transported by the drying gas.

In accordance with the teachings of my aforementioned related application the starting member is removed from the soot preform prior to the consolidation and drying process, and the drying agent is caused to flow into the resultant aperture and through the porous preform. Successful drying of the soot preform can be achieved by employing well known drying agents such as chlorine gas and $SiCl_4$. However, since the inner portion of a soot preform that is to be formed into an optical waveguide filament contains a dopant to increase the refractive index thereof, the application of such conventional drying agents to the preform aperture where the dopant concentration is greatest causes leaching of the dopant from the preform. This results in a decrease in the refractive index of the glass at the center of the resultant filament. Although such a filament functions as an optical waveguide, certain properties thereof are adversely affected, especially in the case of graded index filaments wherein bandwidth is appreciably reduced. In accordance with the teachings of said related application the drying gas preferably contains a component that will, upon reaction in the preform, produce that dopant oxide, the concentration of which tends to be reduced by the aforementioned leaching action. It was found that excessive amounts of the compensating component in the drying gas can cause the formation of a thin layer of a glass rich in the dopant oxide at the inner surface of the hollow preform. This causes breakage due to unbalanced stresses in the resulting consolidated blank. Furthermore, the addition of such compensating agents to the drying gas requires more complicated apparatus for generating the drying gas. Consequently, it has been difficult to control the shape of the index gradient of filaments produced by this prior method.

SUMMARY OF THE INVENTION

It is therefore an object of the present invention to provide an effective and economical method of removing residual water from a flame hydrolysis-deposited glass soot preform during the consolidation process. A further object is to provide a method of forming high bandwidth optical waveguides having extremely low concentrations of water and contaminants.

Briefly, the present invention relates to an improved method of forming a glass optical waveguide filament by the flame hydrolysis process. This process conventionally comprises the steps of depositing on a starting member a coating of flame hydrolysis-produced glass soot to form a soot preform, removing the starting member to form an aperture, consolidating the soot preform to form a dense glass blank, and drawing the blank to form a filament. The consolidation step conventionally comprises subjecting the soot preform to a temperature in the consolidation temperature range for a time sufficient to permit the soot particles to fuse and consolidate, thereby forming a dense glass which is free from particle boundaries. While the preform is heated to its consolidation temperature, a stream of an atmosphere including a drying agent flows into the aperture and through the porous preform, thereby removing water from the preform while the soot is consolidated. The process of fusing glass soot particles formed by flame hydrolysis is sometimes referred to as sintering even though no particle boundaries remain.

In accordance with the present invention the drying gas mixture comprises chlorine and oxygen in amounts sufficient to substantially eliminate water from the preform while not removing excessive amounts of dopant oxide therefrom. During the drying process the chlorine leaches some of the dopant oxide from the preform, especially from the central portion thereof adjacent to the aperture. By compensating for this leaching action by depositing an excessive amount of dopant oxide at the central portion of the preform during the soot deposition process, dry optical waveguide filaments are produced having a predetermined refractive index therethrough.

In accordance with a preferred embodiment of this invention, the refractive index of the soot preform decreases radially from a maximum value at the central portion thereof. The dry, dense glass blank, which is formed by the consolidation step, is heated to the drawing temperature and drawn to form a high bandwidth optical waveguide filament having a desired gradient refractive index.

BRIEF DESCRIPTION OF THE DRAWINGS

FIG. 6 is a graph illustrating the temperature profiles of two furnaces which may be employed in carrying out the method of this invention.

FIG. 7 is a graph which illustrates the near field profile of an optical waveguide filament dried with the gas composition of the present invention. This figure further illustrates a method of determining a compensating refractive index profile of a soot preform to obtain the desired profile.

FIG. 8 is a graph wherein the refractive index of a portion of a soot preform is plotted as a function of radius.

DETAILED DESCRIPTION OF THE INVENTION

It is to be noted that the drawings are illustrative and symbolic of the present invention, and there is no intention to indicate the scale or relative proportions of the elements shown therein. For the purposes of simplicity, the present invention will be described in connection with the formation of a low loss optical waveguide although this invention is not intended to be limited thereto.

Figure 1:
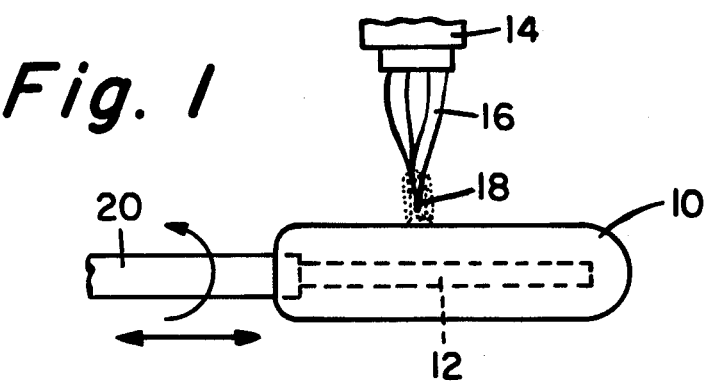
FIGS. 1 and 2 illustrate the application of first and second coatings of glass soot to a starting member.

Referring to FIG. 1, a coating 10 of glass soot is applied to a substantially cylindrical starting member such as a tube or rod 12 by means of flame hydrolysis burner 14. Fuel gas and oxygen or air are supplied to burner 14 from a source not shown. This mixture is burned to produce flame 16 which is emitted from the burner. The vapor of reactant compounds is introduced into flame 16, and the gas-vapor mixture is oxidized within the flame to form a glass soot that leaves flame 16 in a stream 18 which is directed toward starting member 12. The flame hydrolysis method of forming a coating of glass soot is described in greater detail in the aforementioned U.S. Pat. Nos. 3,737,292; 3,823,995 and 3,884,550. Starting member 12 is supported by means of support portion 20 and is rotated and translated as indicated by the arrows adjacent thereto in FIG. 1 for uniform deposition of the soot. Generally, each coating of glass soot is formed of a plurality of layers of soot, each layer being formed by a single pass of the burner along the length of rod 12.

Figure 2:
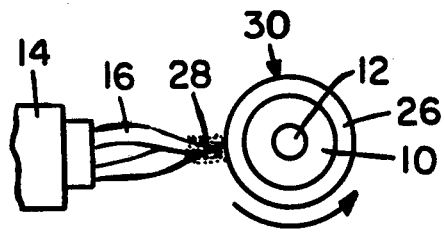

To form a step-index optical waveguide, a second coating 26 of glass soot may be applied over the outside peripheral surface of first coating 10 as shown in FIG. 2. To form a gradient index filament, a plurality of layers of glass soot are applied to the starting member, each layer having a progressively lower index of refraction as taught in U.S. Pat. No. 3,823,995. Gradient index filaments may also be provided with a coating of cladding material.

Figure 3:
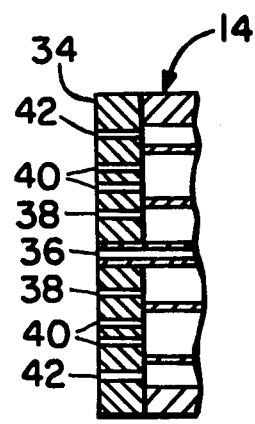
FIG. 3 is a cross-sectional view of a burner that may be employed to form soot preforms.

A fragmentary cross-sectional view of burner 14 is illustrated in FIG. 3. A centrally located orifice 36 in burner face 34 is surrounded by concentric rings of orifices 38, 40 and 42. The reactant compounds emanate from orifice 36 where they are subjected to heat from a flame produced by the fuel gas and oxygen emanating from orifices 40. A stream of oxygen, referred to as the inner shield, emanates from orifices 38; this stream prevents reaction of the reactant compounds at the burner face. Finally, a stream of oxygen referred to as the outer shield emanates from orifices 42. This burner design is somewhat similar to that disclosed in U.S. Pat. No. 3,698,936 issued to H. J. Moltzan, the Moltzan patent differing in that it teaches an annular slot for providing the inner shield and in that it lacks the outer shield orifices. All of the orifices of burner 14 are supplied by manifolds in a manner similar to that taught in the Moltzan patent.

In accordance with well known practice the refractive index of coating 26 is made lower than that of coating 10 by changing the composition of the soot being produced in flame 16. This can be accomplished by changing the concentration or type of dopant material being introduced into the flame, or by omitting the dopant material. Support member 20 is again rotated and translated to provide a uniform deposition of coating 26, the composite structure including first coating 10 and second coating 26 constituting an optical waveguide preform 30.

Since glass starting member 12 is ultimately removed, the material of member 12 need only be such as to have a composition and coefficient of expansion compatible with the material of layer 10. A suitable material may be a normally produced glass having a composition similar to that of the layer 10 material although it does not need the high purity thereof. It may be normally produced glass having an ordinary or even an excessive level of impurity or entrapped gas that would otherwise render it unsuitable for effective light propagation. The starting member may also be formed of graphite, glass, alumina or the like.

In the manufacture of optical waveguides, the materials of the core and cladding of the waveguide should be produced from a glass having minimum light attenuation characteristics, and although any optical quality glass may be used, fused silica is a particularly suitable glass. For structural and other practical considerations, it is desirable for the core and cladding glasses to have similar physical characteristics. Since the core glass must have a higher index of refraction than the cladding for proper operation, the core glass may desirably be formed of the same type of glass used for the cladding and doped with a small amount of some other material to slightly increase the refractive index thereof. For example, if pure fused silica is used as the cladding glass, the core glass can consist of fused silica doped with a material to increase its refractive index.

There are many suitable materials that can satisfactorily be used as a dopant alone or in combination with each other. These include, but are not limited to, titanium oxide, tantalum oxide, tin oxide, niobium oxide, zirconium oxide, aluminum oxide, lanthanum oxide, phosphorus oxide and germanium oxide. Optical waveguides can also be made by forming the core from one or more of the aforementioned dopant oxides, the cladding being made from one or more materials having a lower refractive index. For example, a core made of pure germanium oxide may be surrounded by a cladding layer of fused silica and germanium oxide.

The flame hydrolysis technique results in the formation of glasses having extremely low losses due to scattering and impurity adsorption. Optical waveguides made by this technique have exhibited total losses as low as 1.1 dB/km at 1060 nm. However, in the formation of optical waveguides by this technique, residual water, which is produced by the flame, appears throughout those portions of the waveguide that have been produced by flame hydrolysis. Also, water is readily adsorbed by the soot during handling in air prior to the consolidation process because of the extremely high porosity thereof. Typical waveguides made by this method contain about 100-200 ppm water which contributes 3-6 dB/km to the attenuation of the waveguide at 900 nm, the wavelength emitted by Ga-As sources. For many applications it is desirable to reduce the water content below 10 ppm so that excess loss caused thereby is reduced to about 0.3 dB/km at 900 nm.

Various oxides from which such glass optical waveguides are formed, especially $SiO_2$, have a great affinity for water. However, after such glass waveguides are completely formed, the inner, light propagating portion thereof is inaccessible to water. The tendency of these glasses to absorb water is not detrimental to water-free glass optical waveguides after they are formed since most of the light energy is propagated in and around the core, and the presence of water on the outer surface has a negligible affect on the propagation of such energy.

As disclosed in my aforementioned related application, an optical waveguide preform can be dried by subjecting the preform to a high purity drying agent during the consolidation process. The purity of the drying agent is maintained by flowing a stream of an atmosphere containing the drying agent into the aperture formed by removing the starting member. At least a portion of the stream then flows through the porous preform walls to the outside surface thereof. The resultant gases are flushed away from the blank by a gas such as helium, oxygen, argon, neon or mixtures thereof. The optical waveguide resulting from that method exhibits low loss throughout the visible portion of the spectrum including those wavelengths around 950 nm wherein loss due to the presence of water is greatest.

Figure 4:
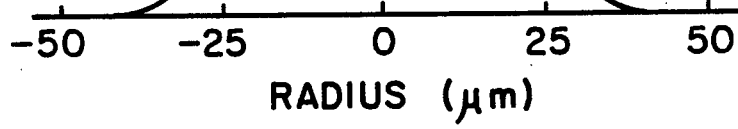
FIG. 4 is a graph which shows the near field profile of an optical waveguide filament dried in accordance with a prior art method.

The main disadvantage that has been encountered during the process whereby the drying agent flows into the preform aperture has been the leaching of a portion of the dopant oxide from the central portion of the soot preform. For example, the method of said related application was employed to dry a soot preform having a near-parabolic refractive index profile, the composition of the central portion of the preform being 15 wt.% $GeO_2$, 3 wt.% $B_2O_3$ and 82 wt.% $SiO_2$. During the consolidation process, $SiCl_4$, $O_2$ and He in the amounts set forth in Example 4 of Table I of said related application were passed down the center aperture of the preform. The $SiCl_4$ was oxidized to $SiO_2$ and $Cl_2$, the latter of which performed the drying. The near field profile of the resulting optical waveguide filament is illustrated in FIG. 4. Techniques for measuring the refractive index profile of optical waveguide filaments are described in the publications: F. M. E. Sladen et al. "Determination of Optical Fiber Refraction Index Profiles by a Near Field Scanning Technique", Applied Physics Letters, Vol. 28, No. 5, Mar. 1, 1975, p. 255 and J. A. Arnaud et al. "Novel Technique for Measuring the Index Profile of Optical Fibers", Bell System Technical Journal, Vol. 55, No. 10, December, 1976, pp. 1489-1508. The profile shown in FIG. 4 indicates that the central portion of the preform suffered severe leaching during the drying process. As mentioned hereinabove, attempts to reduce the amount of leaching by adding to the drying gas mixture a component that would react to form the dopant oxide required more complicated apparatus for generating the drying gas mixture, caused layers of high dopant concentration, and did not give reproducible results.

The main reaction involved in a drying process employing chlorine, for example, can be represented by $$2 \equiv SiOH + Cl_2 \rightarrow \equiv SiOSi \equiv + 2HCl + \tfrac{1}{2}O_2 \qquad (1)$$

where $\equiv SiOH$ indicates a siloxyl group bound to the silica matrix by 3 bridging oxygens. By this reaction hydroxyl groups are removed from the glass by chlorine. However, there is also a side reaction which removes dopant oxides from the soot preform being dried. Chlorine reacts with $GeO_2$, for example, to form volatile products such as $GeOCl_2$ and $GeCl_4$. It has been the lack of control of this reaction in prior art drying techniques that has produced greatly distorted refractive index profiles as well as results that were not reproducible.

I have found that this distortion can be minimized and made reproducible by properly controlling the concentrations of both the chlorine and the oxygen in the gaseous drying mixture. If the reaction whereby germania, for example, is leached from the soot preform is $$GeO_2 + 2\ Cl_2 \rightleftarrows GeCl_4 + O_2 \qquad (2)$$

the equilibrium expression for that reaction is given by:

$$Keq = \frac{[O_2]\,[GeCl_4]}{[GeO_2]\,[Cl_2]^2} \qquad (3)$$

The equilibrium constant for this reaction as written can be estimated to be about 0.25 at 1000° K.

The amount $GeO_2$ leached away by the reaction with chlorine is equal to the amount of $GeCl_4$ formed. To minimize this leaching process and therefore the profile distortion, the concentration of $GeCl_4$ formed in accordance with the following equation should be minimized.

$$GeCl_4 = \frac{Keq\,[Cl_2]^2\,[GeO_2]}{[O_2]} \qquad (4)$$

It is apparent by this expression that the amount of chlorine should be minimized and the amount of oxygen should be maximized within the limits that will yield a good optical waveguide.

The amount of chlorine and oxygen in the drying gas mixture can be in the ranges of 0.1–9.0 vol.% and 1–99.9 vol.%, respectively. The balance, if any, of the drying gas mixture supplied to the preform aperture may be helium, nitrogen, argon or the like, helium being preferred. When the amount of chlorine present in the drying gas mixture reaches about 10 vol.%, dopant oxide leaching begins to become excessive and unpredictable. If 9.0 vol.% chlorine were employed, an amount of oxygen near 90 vol.% should be employed to maintain the production of $GeCl_4$ at an acceptably low level. It has been determined from equation 4 and from actual experience that the ratio (vol.% $Cl_2)^2$/(vol.% $O_2$) should be less than 1.0 vol.% to prevent excessive leaching of dopant oxide from the preform and to enable reproducible results to be achieved, the preferred value of this ratio being less than 0.1 vol.%. When the amount of chlorine present in the drying gas mixture is in the preferred range of 1.0 to 3 vol.%, the drying reaction proceeds at a desirable rate without causing excessive leaching of the dopant oxide. A process employing less than 1.0 vol.% chlorine would require a longer period of time to achieve a given state of dryness. However, since the drying reaction of equation 1 has a large temperature coefficient, it would be advantageous to increase the temperature of the drying reaction if less than 1.0 vol.% chlorine were employed. It is noted that the reaction represented by equation 2, whereby $GeO_2$ is leached from the preform, has a low temperature coefficient. Therefore, the amount of leaching which occurs does not significantly increase with increased temperature. If less than 0.1 vol.% chlorine were employed, the drying reaction would require an exorbitantly long period of time. Even in a specific optical waveguide application wherein more emphasis is placed on refractive index profile control, and less concern is given to minimizing water content, at least 0.1 vol.% chlorine should be employed to obtain minimal drying.

The use of a presoak may be advantageous when the drying process employs a low chlorine content drying gas. The most preform is inserted into the entrance zone of the furnace where it is subjected to a temperature of at least 700° C. but lower than the consolidation temperature of the soot. During this presoak, which usually continues for a period of time between 10 minutes and 1 hour, a partial drying of the preform will occur. The process of water removal can be enhanced during the presoak by flowing a gas such as helium, oxygen or the like, or mixtures thereof, into the preform aperture. Helium is preferred because of its ability to permeate the preform. Thereafter, the chlorine containing drying gas can be passed through the preform interstices to further dry the preform during consolidation. Since a partial drying has occurred, less chlorine is needed during the consolidation process.

It is known that when the drying gas mixture contains a large percentage of oxygen, i.e., an amount greater than about 5 vol.%, seeds may be formed in the resulting consolidated draw blank. Such seeds can cause increased loss in the optical waveguide filament drawn from such a blank. It appears that such seeds are formed by the trapping of oxygen within the preform interstices during the consolidation process. The formation of seeds due to excess oxygen is also dependent upon the pore structure of the preform and the flow rate of the oxygen. If the preform pore structure is substantially uniform, the tendency for oxygen to be trapped will be minimized. High oxygen flow rates also seem to minimize seed formation. Therefore, when the drying gas mixture contains oxygen in amounts greater than about 5 vol.%, the flame hydrolysis process should be carefully controlled so that the pore structure of the resultant preform is an uniform as possible.

A modification in the drying and consolidation process eliminates the seed problem regardless of the amount of oxygen employed in the drying gas mixture. The preform is initially inserted into the entrance zone of the furnace wherein the temperature is high enough to permit the drying reaction to occur but is insufficient to cause the preform to consolidate. During this initial treatment a drying gas having a high oxygen content can be caused to flow into the preform aperture. After the drying process has been completed, but prior to the initiation of the consolidation process, the flow of chlorine and oxygen ceases, and a consolidation gas mixture comprising primarily helium is employed during the consolidation process. The consolidation gas mixture preferably includes a trace of oxygen, i.e. up to 5% oxygen, to keep any impurities present in the preform in the proper oxidation state. As soon as the consolidation gas mixture begins to flow into the preform aperture, the preform can be advanced into a region of the furnace wherein the temperature is high enough to cause the soot to consolidate. In this type of process a drying gas mixture of as little as 0.1 vol.% chlorine and up to 99.9 vol.% oxygen could be employed.

Chlorine for the drying reaction may be obtained by flowing into the preform aperture a chlorine containing compound such as $SiCl_4$, $GeCl_4$, $BCl_3$, HCl, $POCl_3$, $PCl_3$, $TiCl_4$ and $AlCl_3$. Obviously, chlorine containing compounds, constituents of which adversely affect the resultant article, should be avoided. If a constituent of the compound affects the refractive index of the resultant glass, such a compound should be employed in small amounts unless the process is modified to account for such change in refractive index. Bromine should also be a satisfactory drying agent.

The following method has been employed to dry soot preforms in accordance with the present invention. The starting member is removed from the soot preform so that a gas conducting tube can be affixed to an end of the preform. This can be accomplished by merely securing the preform while the handle is pulled therefrom. This method of removing the starting member is facilitated by depositing a layer of soft glass soot on the starting member prior to depositing the preform. Such soft soot is formed by decreasing the flow of fuel gas and oxygen to the burner to reduce the heat produced thereby.

Figure 5:
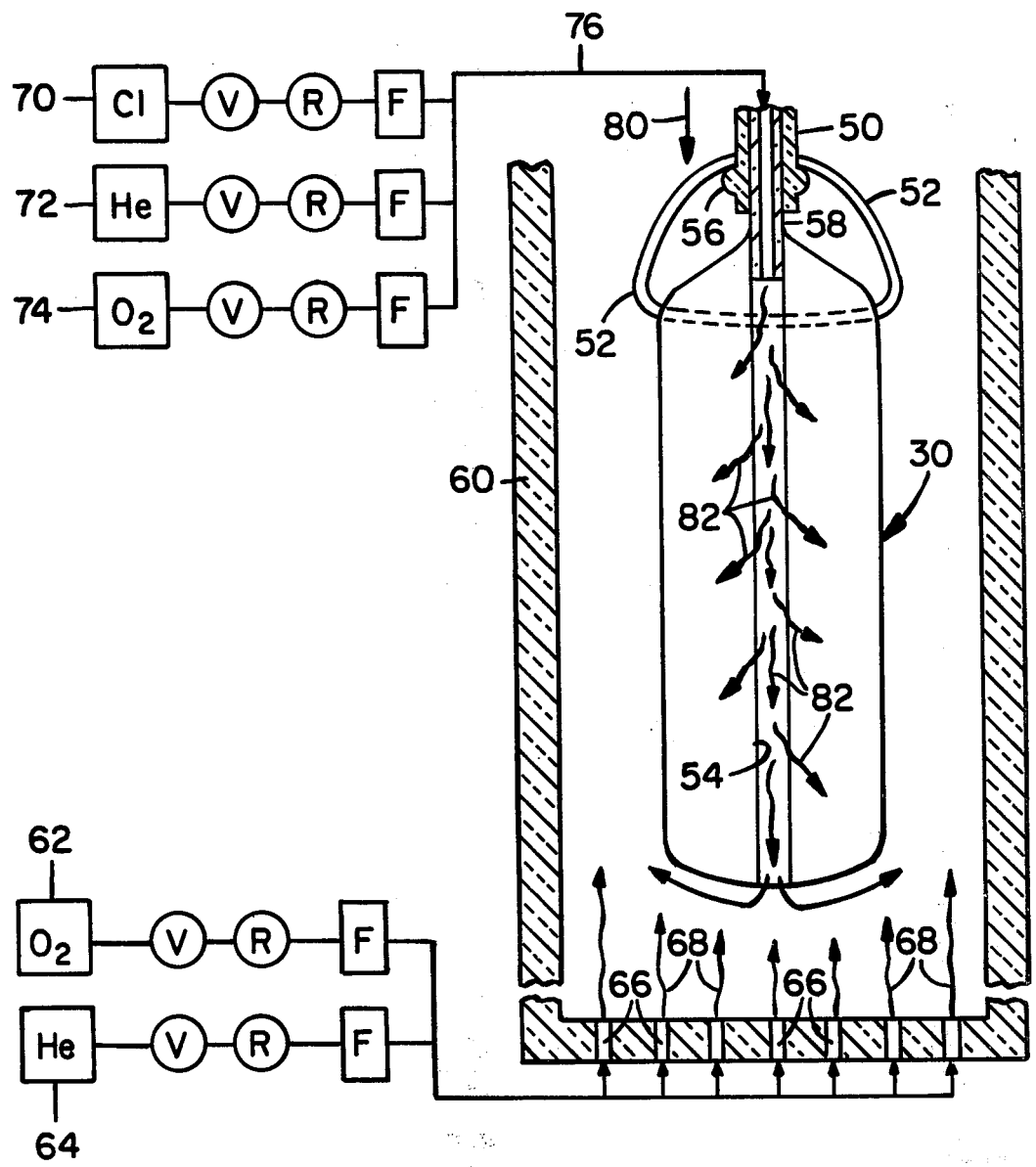
FIG. 5 is a schematic representation of a consolidation furnace and consolidation atmosphere system.

After the starting member is removed, preform 30 is suspended from tubular support 50 as shown in FIG. 5. Two platinum wires, of which only wire 52 is shown, protrude through preform 30 on opposite sides of aperture 54 and are affixed to support 50 just above flange 56. The end of gas conducting tube 58 protrudes from tubular support 50 and into the adjacent end of preform 30. The preform is consolidated by gradually inserting it into consolidation furnace 60. It is preferred that the preform be subjected to gradient consolidation, a technique taught in the aforementioned U.S. Pat. No. 3,933,454, whereby the bottom tip of the preform begins to consolidate first, the consolidation continuing up the preform until it reaches that end thereof adjacent tubular support 50.

The consolidation temperature depends upon the composition of the glass soot and is in the range of 1200°–1700° C. for high silica content soot. It is also time dependent, consolidation at 1200° C. requiring a very long time. The preferred consolidation temperature for high silica content soot is between 1350° C. and 1450° C. Other glasses can be consolidated at lower temperatures, pure germania, for example, consolidating at about 900° C.

Referring again to FIG. 5 the vertical sidewalls of furnace 60 are broken to illustrate that the relative depth thereof is greater than that shown. In this figure flow regulators are schematically represented by the letter "R" within a circle, flowmeters by the letter "F" within a rectangle, and valves by the letter "V" within a circle. Sources 62 and 64 of oxygen and helium, respectively, are connected to orifices 66 in the bottom of furnace 60. Undulated arrows 68 represent the flow of the flushing gas from the orifices. Sources 70, 72 and 74 of chlorine, helium and oxygen, respectively, are connected to line 76.

The consolidation atmosphere system of FIG. 5 is merely representative of a number of systems which may be employed to provide the consolidation furnace and preform with appropriate drying and flushing gases. The flushing gas could be caused to flow from top to bottom of furnace 60. The system illustrated, whereby flushing gas flows into the bottom of furnace 60, is preferred since gas naturally tends to flow upwardly through the furnace. Also, many different arrangements may be employed to provide the desired drying gas mixture, and the present invention is not limited to the arrangement illustrated in FIG. 5. It is only necessary to provide tube 58, and ultimately preform 30, with the desired drying gas mixture, the particular means employed to achieve this mixture being immaterial.

As indicated by arrow 80, preform 30 is inserted downwardly into furnace 60. The rate of insertion is preferably low enough to permit the tip of the preform to consolidate first, the consolidation process then continuing up the preform until it reaches that end of the preform adjacent tubular support 50. The maximum furnace temperature, which is preferably between 1350° C. and 1450° C. for high silica content soot, must be adequate to fuse the particles of glass soot and thereby consolidate the soot preform into a dense glass body in which no particle boundaries exist. The temperature profile of a conventional consolidation furnace is represented by curve 84 of FIG. 6.

As mentioned hereinabove, it may be desirable to subject the porous preform to a helium or a chlorine and oxygen presoak prior to subjecting it to consolidation temperatures. An entrance zone of the furnace should therefore be maintained at a relatively constant temperature which is below the consolidation temperature as indicated by curve 86 of FIG. 6. For high silica content soot, this temperature may be between 700° C. and 1100° C. and is preferably between 800° C. and 1000° C. The temperature of the central zone of this furnace must be sufficiently high to cause the preform to consolidate. This multi-zone furnace may have an end zone that has a relatively constant temperature profile similar to that of the entrance zone, or the temperature beyond the central zone may taper off at a slower rate such as that indicated by curve 84.

As soot preform 30 enters furnace 60 the drying gas passes through tube 58 into preform aperture 54 at least a portion thereof passing into and through the interstices of the preform as indicated by arrows 82. The remainder of the gas flows from the bottom of aperture 54. By optimizing the drying gas composition as discussed hereinabove, the extent of leaching of dopant oxides from the preform can be minimized and the reproducibility of the process is enhanced. For example, a soot preform having a composition of 15 wt.% $GeO_2$, 3 wt.% $B_2O_3$ and 82 wt.% $SiO_2$ at the central portion thereof and a near-parabolic refractive index gradient was dried in a furnace of the type illustrated in FIG. 5. The composition of the drying gas mixture supplied to aperture 54 was 1 vol.% $ClHd 2$, 11 vol.% $O_2$ and 88 vol.% He, the total flow being about 2.25 lpm. A 22 lpm flush of He was supplied to the bottom of the furnace. The preform was lowered at about 10 in. per hr. into the furnace, the maximum temperature of which was about 1400° C. This treatment resulted in a consolidated blank which was drawn into an optical waveguide filament that exhibited the near field profile illustrated by curve 90 of FIG. 7. This optical waveguide contained only about 6 ppm water and exhibited low attenuation, viz. 4.1 and 3.5 dB/km at 820 and 900 nm, respectively. Curve 90 has a small, relatively symmetrical dip therein caused by the leaching of some GeO$_2$ by chlorine, thereby limiting the bandwidth of this fiber to 170 MHz. A discussion of bandwidth and a description of various techniques of measurement thereof can be found in the publication by S. Sentsui et al. entitled "Baseband Responses of Multimode Fibers with Large Δn and Valley at Core-Cladding Boundary", 1977 International Conference on Integrated Optics and Optical Fiber Communication, pp. 431–434.

As indicated hereinabove, prior art methods of drying soot preforms by flowing drying gas into the preform aperture resulted in gross distortion of the refractive index profile, as illustrated by FIG. 4, which limits the bandwidth of the waveguide to about 50–70 MHz. Moreover, the profile was not uniform from blank to blank even though the soot blanks were formed, dried and consolidated by the same method. However, after having minimized profile distortion and obtained reproducible results by the drying method of the present invention, one can take additional steps to reduce profile distortion and thereby maximize the bandwidth of optical waveguide filaments. When the dip in the refractive index profile is reproducible, a soot preform can be formed having a compensating profile so that the profile of the dried and consolidated blank is the desired profile.

The shape of the compensating profile can be determined as follows. A soot preform is formed having a refractive index profile which would result in a filament having a predetermined refractive index profile absent any leaching during the drying process. The preform is dried in accordance with the method of the present invention as described above whereby leaching of dopant oxides is minimized. Assume, for example, that the near field profile of the resulting filament is represented by curve 90 of FIG. 7. The desired profile is represented by dashed line curve 92. The refractive index profiles of subsequently formed soot preforms are determined by subtracting curve 90 from desired curve 92 and adding the difference to curve 92 to obtain a compensating curve 94. After preforms having refractive index gradients illustrated by curve 94 are dried, consolidated and formed into optical waveguide filaments, the near field profiles thereof are approximately represented by curve 92.

Another method which has been employed to compensate for leaching of the dopant oxide is based on the observation that the $\alpha$-value of a filament is reduced by such leaching. For example, if a soot preform is formed having a predetermined gradient calculated to produce an optical waveguide having an $\alpha$-value of 2.2, dopant oxide leaching during drying may cause the resultant waveguide to have an actual $\alpha$-value of 2.6. By forming a preform having an $\alpha$-value lower than the desired value, e.g., 1.7, the $\alpha$-value of the resultant waveguide can be made to approach the desired value of 2.2.

The invention will be further described with reference to specific embodiments thereof which are set forth in the following examples.

The flow rates of gases to the burner during the formation of soot preforms are as follows. Orifices 40 are provided with 6 l/min fuel gas and 5 l/min oxygen. The flow rates of oxygen from orifices 38 and 42 are 3.5 l/min and 2 l/min, respectively. During the formation of the initial layers of soft soot on the starting member, the flow of fuel gas and oxygen to orifices 40 are reduced to 3.6 l/min and 3.0 l/min, respectively.

Each of the preforms formed in accordance with the following examples possesses one of the refractive index gradients shown in FIG. 8. Table I sets forth the flow rates of the reactants needed to form the most highly doped portion of each type of preform. Flow rates of the cladding reactants are the same for all three types of preforms. The compositions of the cladding and of the most highly doped portion of the cores are also set forth. Profile type A, which is represented by curve A of FIG. 8, is not compensated to account for leaching of dopant oxide during the drying process. Preform types B and C have refractive index profiles represented by curves B and C, respectively, of FIG. 8.

TABLE I

| Type of Preform | Core Composition (wt.%) | | | Cladding Composition (wt.%) | | Reactant Flow Rates (g/min) Start of Core | | | Cladding | |
|---|---|---|---|---|---|---|---|---|---|---|
| Index Profile | GeO$_2$ | B$_2$O$_3$ | SiO$_2$ | B$_2$O$_3$ | SiO$_2$ | GeCl$_4$ | BCl$_3$ | SiCl$_4$ | BCl$_3$ | SiCl$_4$ |
| A | 15 | 3 | 82 | 12 | 88 | 0.8 | 0.24 | 8.0 | 1.45 | 8.0 |
| B | 18 | 3 | 79 | 12 | 88 | 0.96 | 0.24 | 8.0 | 1.45 | 8.0 |
| C | 21 | 3 | 76 | 12 | 88 | 1.12 | 0.24 | 8.0 | 1.45 | 8.0 |

EXAMPLE 1

A tubular starting member of fused quartz, approximately 0.6 cm in diameter and about 50 cm long is secured to a handle. Liquid SiCl$_4$, liquid GeCl$_4$ and BCl$_3$ are maintained at 37° C., 37° C. and 30° C. in first, second and third containers, respectively. Dry oxygen is bubbled through the first container at 1100 cc per minute and through the second container at 330 cc per minute. BCl$_3$ is metered out of the third container at 45 cc per minute which is 0.24 g/min. The flow rates of the reactants are listed under the heading "Reactant Flow Rates—Start of Core" for Index Profile A in Table I. These vapors entrained within the oxygen are combined with 0.2 l/min bypass oxygen and the resultant mixture is fed to the burner. This mixture emanates from central orifice 36 and flows into the flame where the GeCl$_4$, BCl$_3$ and SiCl$_4$ are oxidized to form a steady stream of particles having the indicated composition. The soot stream is directed to the starting member and 20 layers of soft soot are deposited thereon to facilitate removal of the starting member from the resultant soot preform. Thereafter, the fuel gas and oxygen flows to the burner are increased in the manner indicated hereinabove, and the hard soot is thereafter applied. As the soot layers of the core are applied, the flow of oxygen through the GeCl$_4$ is continuously decreased and the boron trichloride flow is continuously increased. Thus, each succeeding soot layer has a lower GeO$_2$ content and a higher B$_2$O$_3$ content, thereby yielding a decreasing refractive index as indicated by curve A of FIG. 8.

When the flow of oxygen through the GeCl₄ reaches zero, the boron trichloride flow, which has reached a value of 1.45 g/min, is thereafter held constant. That part of the preform containing $GeO_2$, which is referred to as the core portion, is about 1.0 cm thick. The outer or cladding portion of the preform, wherein the composition is constant throughout, also has a thickness of about 1.0 cm.

The starting member is pulled from the soot preform, thereby leaving a soot preform weighing 300 g and having a diameter of 4.6 cm and a length of 40 cm. The drying gas tube 58 of FIG. 5 is inserted into the preform aperture which has a diameter of about 0.6 cm. Platinum wire is employed to attach the upper end of the preform to a tubular support. The gases and vapors constituting the drying gas flow into the preform aperture at the following rates: 250 ml/min oxygen, 23 ml/min chlorine and 2000 ml/min helium. The concentrations of chlorine and oxygen in the resultant mixture are 1 vol.% and 11 vol.%, respectively. As the drying gas mixture flows into the preform aperture, the preform is lowered into the furnace at about 0.5 cm per min, the maximum furnace temperature being about 1350° C. and the temperature profile thereof being similar to that represented by curve 84 of FIG. 6. A flushing gas of 22 l/min helium flows upward through the furnace.

The preform is completely consolidated in about 90 min. The resultant dense glass body is withdrawn from the furnace and cooled. The resultant structure is drawn at a temperature of about 1800° C. to collapse the central hole and decrease the outside diameter thereof. Drawing is continued until the final waveguide diameter of 125 μm is achieved, the core diameter being about 62 μm. Waveguide attentations at standard measurement wavelengths of 820, 900 and 1060 are 4.3, 3.9 and 2.8 dB/km, respectively.

The near field profile of this waveguide is represented by curve 90 of FIG. 7. The dip in refractive index at the center of the filament is substantially symmetrical and is relatively small compared to that produced by prior art methods. The bandwidth is about 170 MHz, and the α-value thereof is 2.84.

In the remaining examples the preforms are formed in a manner similar to that specified in Example 1 except that the dopant concentration at the central portion thereof may vary as indicated in Table I to provide the specified type of index profile. Moreover, after drying and consolidation of the preforms, optical waveguide filaments are drawn therefrom in the manner specified in Example 1.

EXAMPLES 2-12

Preform profile types and drying gas flow rates and concentration are listed in Table II for Examples 2-12. Some characteristics of the resultant optical waveguide filaments are also set forth. In Examples 2-11 the flushing gas is 22 l/min helium, whereas 34 l/min oxygen is employed in Example 12.

TABLE II

| Ex. | Type of Preform Index Profile | Drying Gas Flow Rates (ml/min) | | | Concentration (vol.%) | | Attenuation (λ in nm) | | | Band-Width (MHz) | Water (ppm) |
| --- | --- | --- | --- | --- | --- | --- | --- | --- | --- | --- | --- |
| | | $Cl_2$ | $O_2$ | He | $Cl_2$ | $O_2$ | 820 | 900 | 1060 | | |
| 2 | A | 23 | 250 | 2000 | 1 | 11 | 5.18 | 4.5 | 3.5 | 230 | * |
| 3 | B | " | " | " | " | " | 3.2 | 2.4 | 1.6 | 610 | 0.5 |
| 4 | B | " | " | " | " | " | 5.1 | 4.3 | 3.4 | 600 | 0.4 |
| 5 | B | " | " | " | " | " | 6.2 | 5.5 | 4.6 | 700 | 2.3 |
| 6 | B | " | " | " | " | " | 4.9 | 4.0 | 3.0 | 520 | 3.0 |
| 7 | B | 26 | 1500 | 700 | 1.16 | 68 | 9.2 | 9.2 | 7.2 | 290 | 16.0 |
| 8 | B | 200 | 250 | 1800 | 8.9 | 11 | 4.9 | 3.8 | 3.6 | 90 | 2.5 |
| 9 | C | 73 | 259 | 1900 | 3.3 | 11 | 5.6 | 5.0 | 4.2 | 250 | 3.5 |
| 10 | C | 200 | 250 | 1800 | 8.9 | 11 | 3.8 | 3.0 | 2.3 | 110 | 1.8 |
| 11 | C | 200 | 250 | 1800 | 8.9 | 11 | 7.0 | 6.0 | 4.4 | 110 | 4.0 |
| 12 | C | 200 | 250 | 1800 | 8.9 | 11 | 4.4 | 3.5 | 2.7 | 130 | 0.3 |

*less than 10 (not measured as precisely as remainder of examples)

In Examples 1 and 2 the drying gas composition was selected to minimize leaching of $GeO_2$, but the refractive index profile was not compensated for the minimal amount of leaching that did occur. The typical bandwidth that was achieved without compensating the preform refractive index profile was 150-250 MHz. The preform refractive index profile was compensated for leaching in Examples 3 through 12 wherein profiles of type B or C were utilized. Best results were obtained in Examples 3-7 wherein the drying gas contained small but effective amounts of chlorine whereby preform drying was accompanied by minimal leaching and wherein that leaching which did occur was substantially compensated by incorporating in the preform an additional amount of dopant was indicated by curve B of FIG. 8. The waveguide produced from Example 3, for example, had a bandwidth of 610 MHz and a refractive index profile similar to that represented by curve 92 of FIG. 7.

The drying gas of Example 9 contained about three times the amount of chlorine employed in Examples 1-7. However, the amount of oxygen employed in the drying gas relative to the amount of chlorine therein was less than the maximum permissible ratio set forth hereinabove. Moreover, the extent of preform compensation was greater for Example 9 than for Examples 1-7, and therefore, the additional leaching resulting from the greater chlorine concentration in the drying gas was to a large extent neutralized. It is noted that the bandwidth of the waveguide of Example 9 was 250 MHz. Waveguides having greater bandwidths could be formed by employing the same drying gas mixture as that which was employed in Example 9 if such process parameters as preform index gradient compensation is more carefully tuned to the entire process.

Examples 8, 10 and 11 resulted in optical waveguides having the greatest index profile distortion and also the lowest bandwidth. These poor results were caused by an excessive concentration of chlorine in the drying gas which was not offset by a sufficient concentration of oxygen therein. It is noted that the ratio of (vol.% $Cl_2$)²/(vol.% $O_2$) in Examples 8, 10 and 11 is greater than 1.0, the preferred maximum value for that ratio. It can be seen that oxygen may be substituted for the helium flush with similar effect. The characteristics of the waveguide of Example 12 are comparable to those of the waveguides of Examples 8, 10 and 11 which utilized the same drying gas mixture as that employed in Example 12.

Table II reveals that a direct correlation between chlorine concentration in the drying gas and water content of the resultant optical waveguide was not obtained for chlorine concentrations between 1 and 8.9 vol.%. However, the water content would increase rapidly as the chlorine content decreased below the minimum concentration of 0.1 vol.% specified hereinabove.

EXAMPLES 13 AND 14

Two preforms are made in accordance with Example 1 except that reactant flow rates are selected to provide index profile type B of Table I. A furnace is provided having a temperature profile of the type represented by curve 86 of FIG. 6. The temperature of the entrance zone is maintained at 800° C., and the maximum temperature is 1350° C. The starting member is pulled from the preform, the drying gas tube of FIG. 5 is inserted into the aperture, and the preform is attached to the tubular support. A flushing gas of 22 l/min helium and 2 l/min oxygen flows upward through the furnace during both the presoak and the consolidation steps. After the treatment within the furnace, which is described hereinbelow, the consolidated draw blanks are drawn into low loss, high bandwidth optical waveguide filaments.

In Example 13 the preform is positioned in the entrance zone of the furnace where it remains for 30 minutes while helium flows into the preform aperture at 2 l/min. The preform then advances into the central zone of higher temperature at a rate of 0.5 cm/min. During consolidation, the drying gas which flows into the preform aperture comprises 23 ml/min chlorine, 250 ml/min oxygen and 2 l/min helium. After the initial 30 minute presoak is completed, consolidation is accomplished in about 60 minutes.

In Example 14 the preform is positioned in the entrance zone, and the drying process is initiated by flowing into the preform aperture a mixture comprising 23 ml/min chlorine, 250 ml/min oxygen and 2 l/min helium. The duration of this presoak is 30 minutes, after which the flow of oxygen and chlorine ceases, and helium continues to flow into the preform aperture at a rate of 2 l/min. The preform is then advanced into the high temperature region of the furnace at 0.5 cm/min where it is consolidated in 60 minutes.

The method disclosed herein can consistently provide optical waveguide filaments having a water content less than 3 ppm thereby reducing the attenuation contribution due to water to less than 0.1 dB/km at 900 nm. At the same time, bandwidths greater than 500 MHz can readily be obtained.

I claim:
1. The method of forming a glass article comprising the steps of
   depositing on a starting member a coating of flame hydrolysis-produced glass soot to form a porous soot preform, the refractive index at the inner portion of said preform being greater than that at the outer portion thereof,
   removing said starting member to form an aperture in said preform,
   disposing said preform in a furnace,
   flowing into said aperture a stream of an atmosphere comprising chlorine and oxygen, the concentration of chlorine being between 0.1 vol.% and 9.0 vol.% and the ratio (vol.% chlorine)$^2$/(vol.% oxygen) being less than 1.0 vol.%, and
   heating said soot preform to a temperature within the consolidation temperature range for a time sufficient to cause said soot particles to fuse and form a dense glass layer.

2. The method of claim 1 wherein the inner portion of said soot preform comprises glass particles doped with a material which increases the refractive index thereof to a value greater than that of the soot particles of the outer portion of said preform, the concentration of said dopant material in the central portion of said preform being in excess of the desired concentration of the corresponding part of said dense glass layer by such an amount as to substantially produce said desired concentration after any leaching of said dopant material occurs during said steps of flowing and heating.

3. The method of claim 1 wherein said ratio is less than 0.1 volume percent.

4. The method of claim 1 wherein said chlorine is present in said atmosphere in an amount within the range of 0.1–9.0 volume percent and said oxygen is present in said atmosphere in an amount within the range of 1.0–99.9 volume percent, the balance of said atmosphere, if any, comprising an inert gas.

5. The method of claim 4 wherein said inert gas is selected from the group consisting of helium, nitrogen and argon.

6. The method of claim 1 wherein said chlorine is present in said atmosphere in an amount within the range of 1–3 volume percent.

7. The method of claim 1 wherein the steps of flowing and heating are performed simultaneously.

8. The method of claim 1 wherein, prior to the step of flowing, said preform is subjected to a presoak during which it is heated to a temperature of at least 700° C. but less than the consolidation temperature thereof for a period of time sufficient to cause a partial drying of said preform.

9. The method of claim 8 wherein said preform is subjected to a helium atmosphere during said presoak.

10. The method of claim 1 wherein, during the step of flowing, said preform is heated to a temperature between 700° and 1100° C. and which is below the consolidation temperature thereof and wherein the flow of oxygen and chlorine into said preform aperture cease prior to the step of heating, the method further comprising the step of flowing into said aperture a stream of an atmosphere consisting primarily of helium during the step of heating.

11. The method of claim 10 wherein said oxygen is present in said atmosphere in an amount greater than 5 volume percent.

12. The method of claim 11 wherein, during the step of heating, a stream of an atmosphere comprising up to 5 volume percent oxygen and the remainder being helium is flowed into said aperture.

13. In the method of forming a glass article comprising the steps of
   depositing on a starting member a coating of flame hydrolysis-produced glass soot particles to form a porous soot preform, the refractive index of said particles being greater at the inner portion of said preform than those at the outer portion thereof, removing said starting member to form an aperture in said preform, flowing a stream of an atmosphere containing a drying agent into said aperture, at least a portion of said stream flowing outwardly from the center of said preform through the interstices therein to the outer surface thereof, and disposing said preform in a furnace wherein it is subjected to a temperature within the consolidation temperature range for a time sufficient to cause said soot particles to fuse and form a dense glass article having a desired value of refractive index at the central portion thereof and a desired refractive index gradient radially throughout said glass article, the step of depositing being characterized in that it comprises depositing a soot preform wherein at least the inner portion of said soot preform comprises glass particles doped with a material which increases the refractive index thereof to a value greater than that of the soot particles of the outer portion of said preform, the concentration of said dopant material at the central portion of said preform being in excess of the desired concentration of the corresponding part of said dense glass article by such an amount as to substantially produce said desired concentration after leaching of said dopant material occurs during the step of flowing, and the step of flowing being characterized in that it comprises flowing into said aperture a stream of an atmosphere comprising chlorine and oxygen, the concentration of chlorine being between 0.1 vol.% and 9.0 vol.% and the ratio (vol.% chlorine)$^2$/(vol.% oxygen) being less than 1.0 vol.%.

14. A method in accordance with claim 13 wherein the step of flowing is characterized in that it comprises flowing into said aperture a stream of an atmosphere comprising chlorine and oxygen, the volume percent of oxygen in said atmosphere being sufficiently higher than that of said chlorine so that excessive leaching of said dopant material from the inner portion of said preform is prevented.

15. A method in accordance with claim 14 further comprising the step of heating said dense glass article to a temperature within the drawing temperature range thereof and drawing said article to close the aperture therein and to reduce the diameter thereof to form an optical waveguide filament.

* * * * *